US011122381B2

(12) United States Patent
Eronen et al.

(10) Patent No.: US 11,122,381 B2
(45) Date of Patent: Sep. 14, 2021

(54) SPATIAL AUDIO SIGNAL PROCESSING

(71) Applicant: Nokia Technologies Oy, Espoo (FI)

(72) Inventors: Antti Eronen, Tampere (FI); Arto Lehtiniemi, Lempaala (FI); Jussi Leppanen, Tampere (FI); Tapani Pihlajakuja, Vantaa (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/649,433

(22) PCT Filed: Oct. 1, 2018

(86) PCT No.: PCT/FI2018/050704
§ 371 (c)(1),
(2) Date: Mar. 20, 2020

(87) PCT Pub. No.: WO2019/073109
PCT Pub. Date: Apr. 18, 2019

(65) Prior Publication Data
US 2020/0288262 A1 Sep. 10, 2020

(30) Foreign Application Priority Data
Oct. 9, 2017 (GB) ...................................... 1716523

(51) Int. Cl.
*H04S 7/00* (2006.01)
(52) U.S. Cl.
CPC .......... *H04S 7/303* (2013.01); *H04R 2201/40* (2013.01); *H04S 2400/15* (2013.01)
(58) Field of Classification Search
CPC .. H04S 7/303; H04S 2400/15; H04R 2201/40
(Continued)

(56) References Cited

U.S. PATENT DOCUMENTS 9,749,738 B1      8/2017  Adsumilli et al.
2015/0036848 A1*  2/2015  Donaldson ............. H04S 7/303
                                                       381/303
(Continued)

FOREIGN PATENT DOCUMENTS

EP      3059605 A1      8/2016
EP      3131311 A1      2/2017

OTHER PUBLICATIONS

Pihlajamaki, T. et al., "Synthesis of Complex Sound Scenes with Transformation of Recorded Spatial Sound in Virtual Reality." Journal of the Audio Engineering Society 2015, vol. 63, abstract only.

(Continued)

*Primary Examiner* — William A Jerez Lora
(74) *Attorney, Agent, or Firm* — Harrington & Smith

(57) ABSTRACT

An apparatus for spatial audio signal processing, the apparatus including at least one processor configured to: receive captured audio content, the captured audio content captured within a capture environment with defined geometry; determine audio directions and distances associated with the captured audio content; determine a listening space area geometry; map the audio directions and distances associated with the captured audio content relative to the defined geometry to the listening space area geometry; and synthesize a volumetric audio based on the mapped audio directions and distances to generate an audio content experience within the listening space area geometry.

20 Claims, 8 Drawing Sheets

(58) Field of Classification Search
USPC .............................. 381/56, 58, 124, 303, 310
See application file for complete search history.

(56) References Cited

U.S. PATENT DOCUMENTS

2016/0345086 A1* 11/2016 Chamberlin .............. H02J 7/00
2019/0180499 A1*  6/2019 Caulfield ................ G06T 15/06

OTHER PUBLICATIONS

Vaananen R et al. "Encoding and Rendering of Perceptual Sound Scenes in the Carrouso Project" Preprints of Papers Presented at the AES Convention. May 1, 2002, pp. 289-297, XP008084287.p.

* cited by examiner

SPATIAL AUDIO SIGNAL PROCESSING

CROSS REFERENCE TO RELATED APPLICATION

This patent application is a U.S. National Stage application of International Patent Application Number PCT/FI2018/050704 filed Oct. 1, 2018, which is hereby incorporated by reference in its entirety, and claims priority to GB 1716523.4 filed Oct. 9, 2017.

FIELD

The present application relates to apparatus and methods for spatial audio signal processing, but not exclusively for time-frequency domain spatial audio signal processing for volumetric audio reproduction.

BACKGROUND

Capture of audio signals from multiple sources and mixing of audio signals when these sources are moving in the spatial field requires significant effort. For example the capture and mixing of an audio signal source such as a speaker or artist within an audio environment such as a theatre or lecture hall to be presented to a listener and produce an effective audio atmosphere requires significant investment in equipment and training.

A commonly implemented system is where one or more 'external' microphones, for example a Lavalier microphone worn by the user or an audio channel associated with an instrument, is mixed with a suitable spatial (or environmental or audio field) audio signal such that the produced sound comes from an intended direction.

The general field of the technology is spatial sound capture from OZO or a similar capture device or a group of capture devices. In particular there is known and implemented spatial sound capture which, for a dedicated decoder, enables 3 degrees of freedom (3DOF) audio reproduction using headphones, a head-mounted display (HMD), and a computer (or any similar configuration such as a smart phone attached to a VR mount).

The 3DOF consists of 3 orthogonal rotations. Sensors in present HMDs can provide this 3DOF information to existing systems such as OZO Software Suite or YouTube 360. The user can then rotate the head to view different angles of the captured VR content. A 3DOF system is one therefore where head rotation in three axes yaw/pitch/roll can be taken into account. This facilitates the audiovisual scene remaining static in a single location as the user rotates their head.

An improvement or the next stage could be referred as 3-DoF+, where the system facilitates limited movement (translation, represented in Euclidean spaces as x, y, z). For example, the movement might be limited to a range of some tens of centimetres around a central location.

From existing VR applications it is evident that 6DOF greatly improves the immersion to the VR environment. 6DOF video capture and reproduction for other VR/MR/AR applications is thus expected. Thus a current research target is 6-DoF volumetric virtual reality, where the user is able to freely move in a Euclidean space (x, y, z) and rotate his head (yaw, pitch, roll). 6-DoF volumetric VR/AR (Virtual Reality/Augmented Reality) is already supported in some of the current HMDs (Head Mounted Devices) (e.g., HTC Vive).

In the following discussions "user movement" is used as a general term to cover any user movement i.e. changes in (a) head orientation (yaw/pitch/roll) and (b) any changes in user position (done by moving in the Euclidian space or by limited head movement).

One of the issues associated with volumetric audio is the generation of suitable volumetric content and the presentation of such content. In other word the problems associated with capturing and reproducing volumetric audio.

A specific problem is how to match an experience captured within a large space and typically from more than one position and present it within a smaller space while getting both the high quality experience plus the personal audio space.

In general, when reproducing volumetric audio, the user is able to move their listening position in addition to head rotation. This requires a system which has the ability to link sound objects to world coordinates around the user.

In addition to conventional parametric spatial audio capture, which enables just head rotation, two further aspects need to be considered.

The first additional aspect is to be able to estimate sound source distances with respect to the capture device location in addition to the direction (of arrival) between the sound source and the capture device location. Distance estimation has been tackled, for example, in GB patent application number 1710093.4. Furthermore instead of estimating the distances, suitable distance estimates could be assumed based on some (arbitrary) room geometry, such as discussed in Pihlajamaki, Tapani, and Ville Pulkki. "Synthesis of Complex Sound Scenes with Transformation of Recorded Spatial Sound in Virtual Reality." Journal of the Audio Engineering Society 63.7/8 (2015): 542-551.

The second aspect to be considered is a method to place the sound sources at suitable locations in the user's experiencing environment, including scaling of the distances and positions of the sound sources with respect to the capture phase. Such methods are needed to enable volumetric audio reproduction.

Furthermore, often professional volumetric audio capture audio signals are not the only audio capture of interest to the user to be listened later. The user may capture spatial audio content themselves, using their spatial audio capture (SPAC) capable mobile device, or may have access to a further user's spatial audio content, for example from a friend's spatial audio capture (SPAC) capable mobile device at the same event as the user and it would therefore be advantageous to be able to combine the personal spatial audio capture audio signals to the professional capture audio signals.

SUMMARY

There is provided according to a first aspect An apparatus for spatial audio signal processing, the apparatus comprising at least one processor configured to: receive captured audio content, the captured audio content captured within a capture environment with defined geometry; determine audio directions and distances associated with the captured audio content; determine a listening space area geometry; map the audio directions and distances associated with the captured audio content relative to the defined geometry to the listening space area geometry; and synthesize a volumetric audio based on the mapped audio directions and distances to generate an audio content experience within the listening space area geometry.

The at least one processor configured to receive the captured audio content may be further configured to receive at least one of: professional audio content, the professional audio content captured within the capture environment with defined geometry; and personal audio content, the personal audio content captured within the capture environment with defined geometry.

The at least one processor configured to determine audio directions and distances associated with the captured audio content may be further configured to receive the audio directions and distances associated with the captured audio content.

The at least one processor configured to determine audio directions and distances associated with the captured audio content may be further configured to analyse the captured audio content to generate the audio directions and distances associated with the captured audio content.

The at least one processor configured to receive the captured audio content may be further configured to receive both of: professional audio content, the professional audio content captured within the capture environment with defined geometry; and personal audio content, the personal audio content captured within the capture environment with defined geometry, wherein the at least one processor configured to determine audio directions and distances associated with the captured audio content may be further configured to: generate a local personal audio content by removing a common part between the captured professional audio content and the captured personal audio content from the captured personal audio content; and analyse the local personal audio content to determine the audio directions and distances associated with the local personal audio content.

The at least one processor configured to determine audio directions and distances associated with the captured audio content may be further configured to: generate a far professional audio content by removing a common part between the captured professional audio content and the captured personal audio content from the captured professional audio content; analyse the far professional audio content to determine audio directions and distances associated with the far professional audio content.

The processor configured to synthesize a volumetric audio based on the mapped audio directions and distances to generate an audio content experience within the listening space area geometry may be configured to: synthesize a personal volumetric audio using the local personal audio content based on the mapped audio directions and distances to generate a local personal audio content experience within the listening space area geometry; synthesize a professional volumetric audio using the far professional audio content based on the mapped audio directions and distances to generate a far professional audio content experience within the listening space area geometry associated with the professional audio content; and mix the professional volumetric audio and the personal volumetric audio to generate the volumetric audio to generate the audio content experience.

The at least one processor may be further configured to determine a listening position.

The processor configured to synthesize the professional volumetric audio may be configured to synthesize the professional volumetric audio based on the listening position.

The processor configured to synthesize the personal volumetric audio may be configured to synthesize the personal volumetric audio based on the listening position.

The processor configured to receive captured personal audio content may be configured to receive at least two separate captured personal audio contents, and wherein the processor may be configured to selectively switch between the at least two separate captured personal audio contents based on a user interface input.

The processor configured to determine a listening space area geometry associated with the audio content may be configured to: determine a listening space area geometry; and determine within the listening space area geometry a listening space area geometry associated with the audio content.

The processor configured to determine a listening space area geometry may be configured to: receive information from at least one sensor located within the listening space; and determine a listening space area geometry from the information from at least one sensor located within the listening space.

The apparatus may further comprise the at least one sensor, wherein the at least one sensor may comprise at least one of: a camera pair; a phase or time difference based laser range detector; and a light field camera.

The apparatus may further comprise at least two microphones, the at least two microphones may be configured to capture the personal audio content.

The captured professional audio content may comprise at least one of: an audio signal captured by a close microphone within the capture environment; an audio signal captured by a PA microphone within the capture environment; an audio signal captured from a mixing desk within the capture environment; and an audio signal captured by a spatial microphone array within the capture environment.

According to a second aspect there is provided a method for spatial audio signal processing comprising: receiving captured audio content, the captured audio content captured within a capture environment with defined geometry; determining audio directions and distances associated with the captured audio content; determining a listening space area geometry; mapping the audio directions and distances associated with the captured audio content relative to the defined geometry to the listening space area geometry; and synthesizing a volumetric audio based on the mapped audio directions and distances to generate an audio content experience within the listening space area geometry.

Receiving the captured audio content is further comprises at least one of: receiving professional audio content, the professional audio content captured within the capture environment with defined geometry; and receiving personal audio content, the personal audio content captured within the capture environment with defined geometry.

Determining audio directions and distances associated with the captured audio content may comprise one of: receiving audio directions and distances associated with the captured audio content; and analysing the captured audio content to generate the audio directions and distances associated with the captured audio content.

Receiving the captured audio content may comprise: receiving professional audio content, the professional audio content captured within the capture environment with defined geometry; and receiving personal audio content, the personal audio content captured within the capture environment with defined geometry, wherein determining audio directions and distances associated with the captured audio content may comprise: generating a local personal audio content by removing a common part between the captured professional audio content and the captured personal audio content from the captured personal audio content; and analysing the local personal audio content to determine the audio directions and distances associated with the local personal audio content.

Determining audio directions and distances associated with the captured audio content may comprise: generating a far professional audio content by removing a common part between the captured professional audio content and the captured personal audio content from the captured professional audio content; analysing the far professional audio content to determine audio directions and distances associated with the far professional audio content.

Synthesizing a volumetric audio based on the mapped audio directions and distances to generate an audio content experience within the listening space area geometry may comprise: synthesizing a personal volumetric audio using the local personal audio content based on the mapped audio directions and distances to generate a local personal audio content experience within the listening space area geometry; synthesizing a professional volumetric audio using the far professional audio content based on the mapped audio directions and distances to generate a far professional audio content experience within the listening space area geometry associated with the professional audio content; and mixing the professional volumetric audio and the personal volumetric audio to generate the volumetric audio to generate the audio content experience.

The method may further comprise determining a listening position.

Synthesizing the professional volumetric audio may comprise synthesizing the professional volumetric audio based on the listening position.

Synthesizing the personal volumetric audio may comprise synthesizing the personal volumetric audio based on the listening position.

Receiving captured personal audio content may comprise receiving at least two separate captured personal audio contents, and wherein the method may further comprise selectively switching between the at least two separate captured personal audio contents based on a user interface input.

Determining a listening space area geometry associated with the audio content may comprise: determining a listening space area geometry; and determining within the listening space area geometry an listening space area geometry associated with the audio content.

Determining a listening space area geometry may comprise: receiving information from at least one sensor located within the listening space; and determining a listening space area geometry from the information from at least one sensor located within the listening space.

The received captured professional audio content may comprise at least one of: an audio signal captured by a close microphone within the capture environment; an audio signal captured by a PA microphone within the capture environment; an audio signal captured from a mixing desk within the capture environment; and an audio signal captured by a spatial microphone array within the capture environment.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
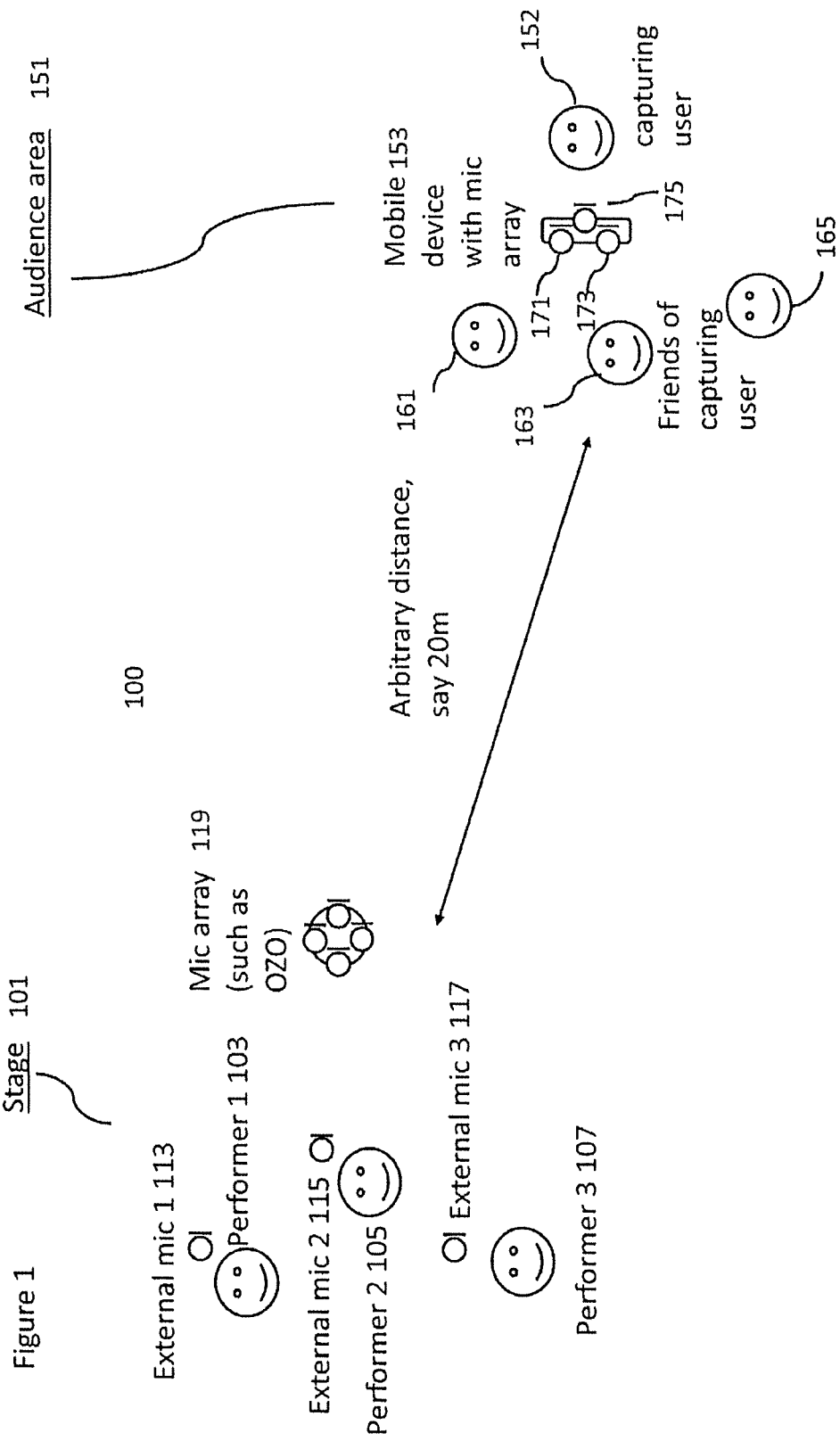
FIG. 1 shows schematically an example capture environment suitable for implementing some embodiments.

The following describes in further detail suitable apparatus and possible mechanisms for the provision of effective volumetric audio reproduction.

The concept as described in detail hereafter presents a method of scaling a volumetric audio experience such that it conveniently can be experienced in the user's own listening space.

Furthermore the concept may be extended to a method of including (the user's or other local user's) own or personal spatial audio capture to a professional volumetric spatial audio capture, and making the (user's or local user's) own or personal spatial audio capture volumetric within a limited area in the user's room.

In the following embodiments there is presented apparatus and methods for scaling a volumetric audio experience such that it can be conveniently experienced in the user's listening space. The term scaling is understood to define in some embodiments fitting an audio experience possibly captured in a large area such as a convert venue into an ordinary, typical experiencing environment such as a living room. The term scaling may also be understood to define in some embodiments making an experience captured in a very limited area larger to fill the whole room.

In the embodiments as described herein apparatus for (and methods of) combining the experience from two different volumetric audio capture sources, for example, one made professionally and one made personally (in other words one made by the user himself or from a personal source made available to the user).

In some embodiments the apparatus and methods may utilize the user's room geometries (such as the presence of sofas or other natural dividers or areas in the room) for scaling and allocating parts of the volumetric experience.

In the following examples the system is described with respect to a concert recording (capture) and experience (reproduction). It would be understood that the professional volumetric spatial audio capture location can be other than a concert venue and for an event/experience other than a concert. For example a professional volumetric spatial audio capture location and event may be a theatre play, panel discussion, reporter on field, movie, circus performance, etc. However the same or similar methods and apparatus may be applied to the generation of volumetric audio content and reproduction of volumetric audio content.

The following examples describe a scenario where a user is configured to capture audio signals of a band playing on a stage. The user may make this capture with their mobile phone or suitable electronic device equipped with microphone(s) and suitable positional information. The mobile phone may be configured to capture a "personal audio space", containing the immediate surroundings of the user, for example, voices of their friends, along with the band capture. Also, the mobile phone may be configured to capture the audio signals relating to the band playing through the public address (PA) system of the concert.

Simultaneously, a professional capture of the band on the stage may be performed. The professional capture may utilize close microphone techniques to capture each performer in high quality. Moreover, additional microphone arrays such as the one in the OZO camera may be used for spatial audio capture.

Later on, the user may wish to reproduce or experience the concert. To make the volumetric audio experience enjoyable in their own listening environment (which is naturally much smaller than the concert venue) the following may be performed:

The common part of the professional volumetric audio signal capture and the user's (personal) own audio signal capture is removed from the user's own audio signal capture. This may for example be achieved by removing the audio signals (music) from the captured PA system parts from the user's own captured audio signals. As a result, the user's own audio signal capture contains the other audio events such as the sounds of his friends and the other crowd near his mobile device and not the content of the main event anymore. It is noted that removal may mean suppressing or attenuation to a certain degree, say a certain number of decibels such as 30 dB, and does not necessarily mean full removal.

The system may be configured to determine the geometry of the user's listening space (for example their living room). In some embodiments this may utilize an AR device such as Hololens or other suitable mechanism for identifying two portions of the space: 1) a space immediately close to the user's current location such as their sofa as a place to present the user's own capture as a volumetric audio experience; and 2) a portion of the space to present the professional volumetric experience.

The sounds in the personal capture may then be positioned to suitable locations of the personal space, for example, the corners of the sofa.

The sounds in the professional capture may then be positioned to suitable locations in the portion of the space determined suitable for the concert experience.

In implementing such methods the user can conveniently experience both their own (personal) audio signal capture and the main (professional) audio signal capture as a volumetric audio experience, scaled to fit to their own environment.

In some embodiments where the sharing of personal audio capture is available then any shared personal audio signal capture may be added near to the user's own audio scene. In such embodiments the user may be able to switch between the various personal ambiances. This switching may be achieved for example using a suitable user interface on the listening device where a drag and slide operation permits a shared personal spatial audio signal capture to be moved on top of a representation of the current user or a user interface input permits a representation of the user to move to a new personal spatial audio signal capture location.

In some embodiments the rendering part can be experienced using a suitable mobile devices or personal audio player.

With respect to FIG. 1 apparatus and environment associated with a capture phase of some embodiments is shown. For example FIG. 1 shows the capture environment, for example a concert hall 100. The capture environment may have a well defined and known geometry. In some embodiments the capture environment geometry may be estimated by a user when performing a capture operation within the environment.

Within the concert hall (capture environment) 100 may be stage area 101 on which the band is playing and an audience area 151 within which the audience is able to experience the environment.

For example as show in FIG. 1 the stage area 101 may feature a performer 1 103, a performer 2 105 and a performer 3 107. Also the audience area 151 may feature a capturing user 152 and friends of the capturing user shown by references 161, 163, and 165.

The example shown in FIG. 1 shows an arbitrary distance between the audience area 151 and the stage area 101 which may be in the area of 20*m*.

FIG. 1 furthermore shows examples of professional capture apparatus which are suitable for implementing some embodiments. For example the capture apparatus may comprise external microphones which capture high quality signal of each performer. Thus for example FIG. 1 shows the capture system comprising an external microphone 1 113 associated with the performer 1 103, an external microphone 2 115 associated with the performer 2 105 and an external microphone 3 117 associated with the performer 3 107. The external microphones may be Lavalier microphones. The Lavalier microphone is an example of a 'close' audio source capture apparatus and may in some embodiments be a boom microphone or similar neighbouring microphone capture system. The Lavalier microphone may in some embodiments be a microphone array. The Lavalier microphone typically comprises a small microphone worn around the ear or otherwise close to the mouth. For other sound sources, such as musical instruments, the audio signal may be provided either by a Lavalier microphone or by an internal microphone system of the instrument (e.g., pick-up microphones in the case of an electric guitar).

FIG. 1 furthermore shows additional professional capture apparatus in the form of microphone array 119 used to make a spatial audio capture. In some embodiments there may be more than one microphone array or multiple sub-arrays or a microphone array. In some embodiments the microphone array 119 is a microphone array within a virtual reality capture device further comprising virtual reality camera(s), for example a Nokia OZO device. In some embodiments the professional capture apparatus further comprises microphones configured to directly capture the output of the PA system. In some embodiments extra microphones are suitably positioned somewhere in the capture environment, for example within the audience area 151 enabling the capture of the PA sound in the audience area. In some embodiments a software capture of the signal output from the PA can be used for example an output directly from the mixing desk. In some further embodiments the external microphones may be grouped together as a microphone array and the audio signals captured from the microphones of the 'array' on the stage area 101 used. It is noted that in some embodiments the professional capture can contain only close microphones or only a microphone array.

Furthermore FIG. 1 shows examples of personal capture apparatus which are suitable for implementing some embodiments. The personal capture may for example be performed with a mobile device 153 (or other suitable spatial audio capture capable device) in the audience area 151. The personal capture audio signals include the sound from the PA of the concert along with the sounds nearby the device, such as user's friends. Personal capture apparatus therefore may be implemented by a mobile device, such as a mobile phone comprising a microphone array such as microphones 171, 173, 175. It is noted that in some embodiments the personal capture could be performed with external microphones, for example, two or more microphones connected to a recording device.

In some embodiments the professional and personal capture apparatus audio signals are passed to the mobile device 153 for processing for volumetric audio playback as shown in the following examples. However it is understood that in some embodiments the professional and personal capture apparatus audio signals are passed to server or servers (for example as implemented in cloud based server system) and which can receive information from the playback device (such as the playback environment geometry information, positional/directional information from the playback user, information of the time of capture and other user input) in order to generate suitable playback audio signals which are passed directly to the playback device for presentation to the user.

Figure 2:
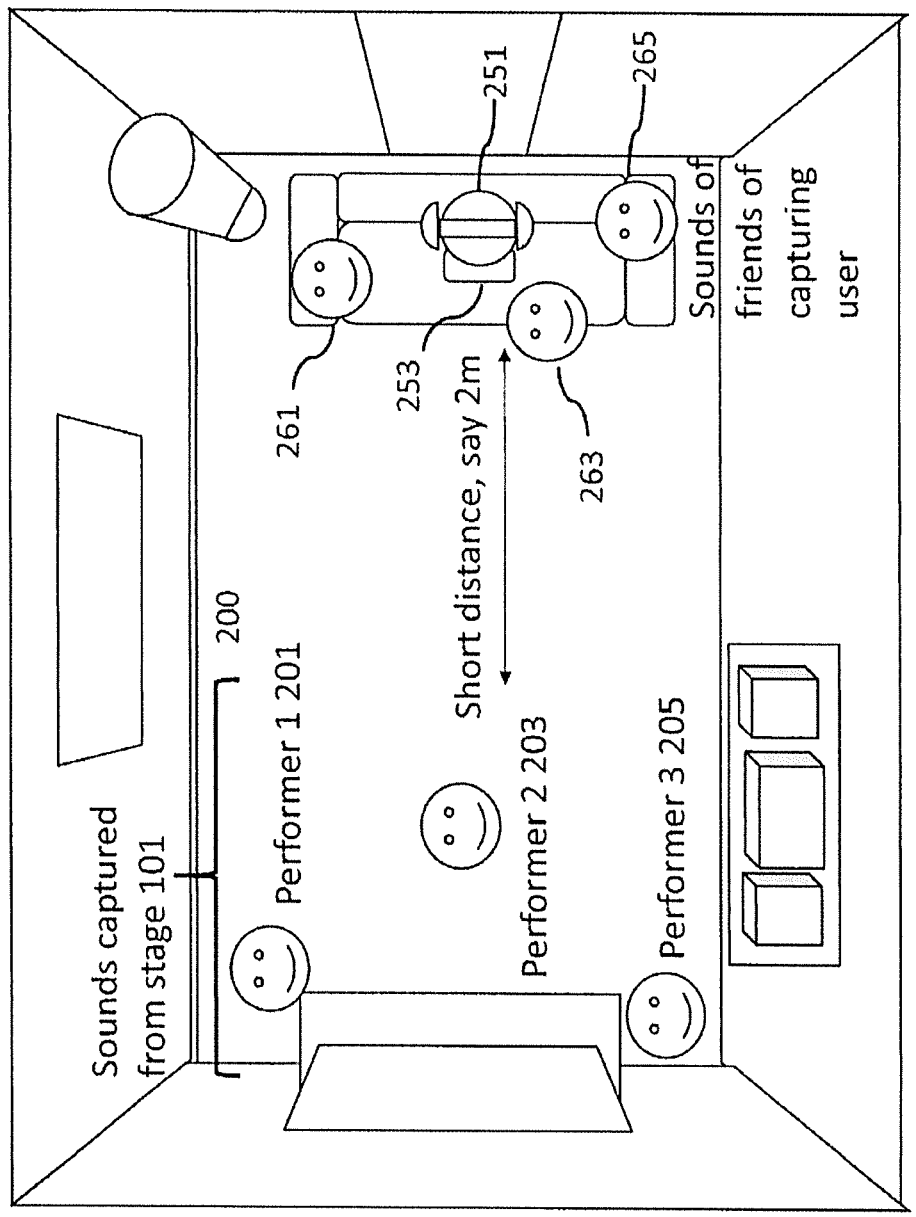
FIG. 2 shows schematically an example reproduction environment for implementing some embodiments.

With respect to FIG. 2 apparatus and environment associated with a playback phase of some embodiments is shown. For example FIG. 2 shows the playback environment, for example a living room 200. The playback environment 200 may also have a well defined and known geometry. In some embodiments the playback environment geometry may be determined by a playback user 251 and playback apparatus, such as AR apparatus 253 or suitable VR apparatus with external environment capture capacity. The playback apparatus may in some embodiments comprise a suitable mobile device mounted in a VR headset such as daydream viewer. The playback apparatus may furthermore comprise suitable audio playback apparatus such as a headphone or headset coupled to the mobile device (either wirelessly or wired).

As shown in FIG. 2 the playback apparatus 253 worn by the user 251 may be configured to generate suitable (audio) playback experience such that the sounds captured from the stage 101 are presented within the listening environment in such a manner that they 'exist' within the playback environment space. For example FIG. 2 shows the experienced performer 1 201, experienced performer 2 203 and experienced performer 3 205 within the living room 200 and located a short distance (for example 2m) away from the listener whereas the sound of the friends of the capturing user 261, 263, and 265 are located within the living room 200 at a much closer distance.

Figure 3:
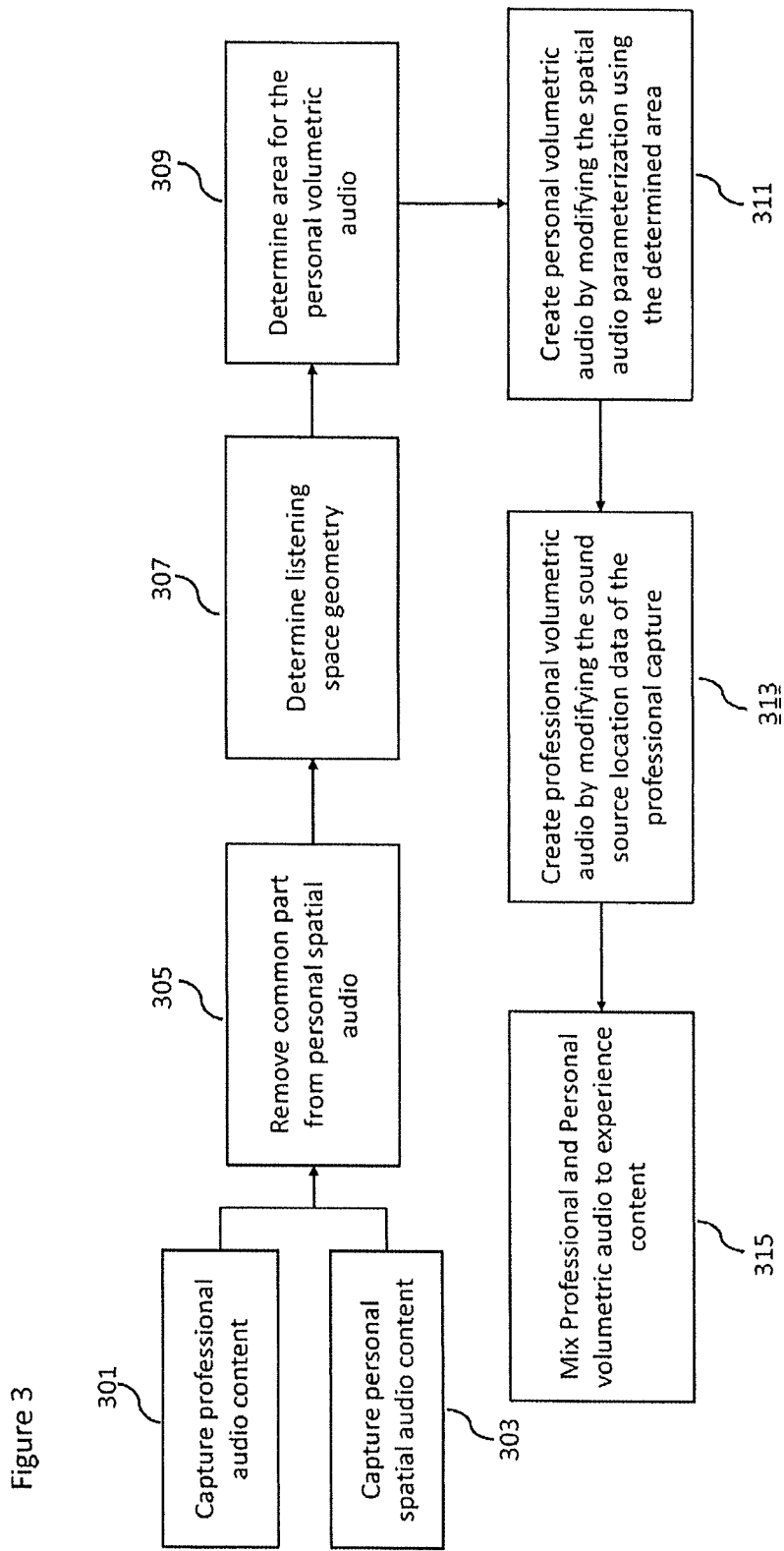
FIG. 3 shows a flow diagram of the operations of some embodiments implementing the system of capture and reproduction of volumetric audio.

With respect to FIG. 3 a flow diagram of the operations of some embodiments implementing the system of capture and reproduction of volumetric audio is shown.

In some embodiments the professional capture apparatus as shown in FIG. 1 is configured to capture professional content.

The operation of capturing professional content is shown in FIG. 3 by step 301.

In some embodiments the personal capture apparatus as shown in FIG. 2 is configured to capture personal content.

The operation of capturing personal content is shown in FIG. 3 by step 303.

Having captured both personal and professional content the personal and professional content may be processed in order to generate the experienced volumetric audio signals.

Figure 4:
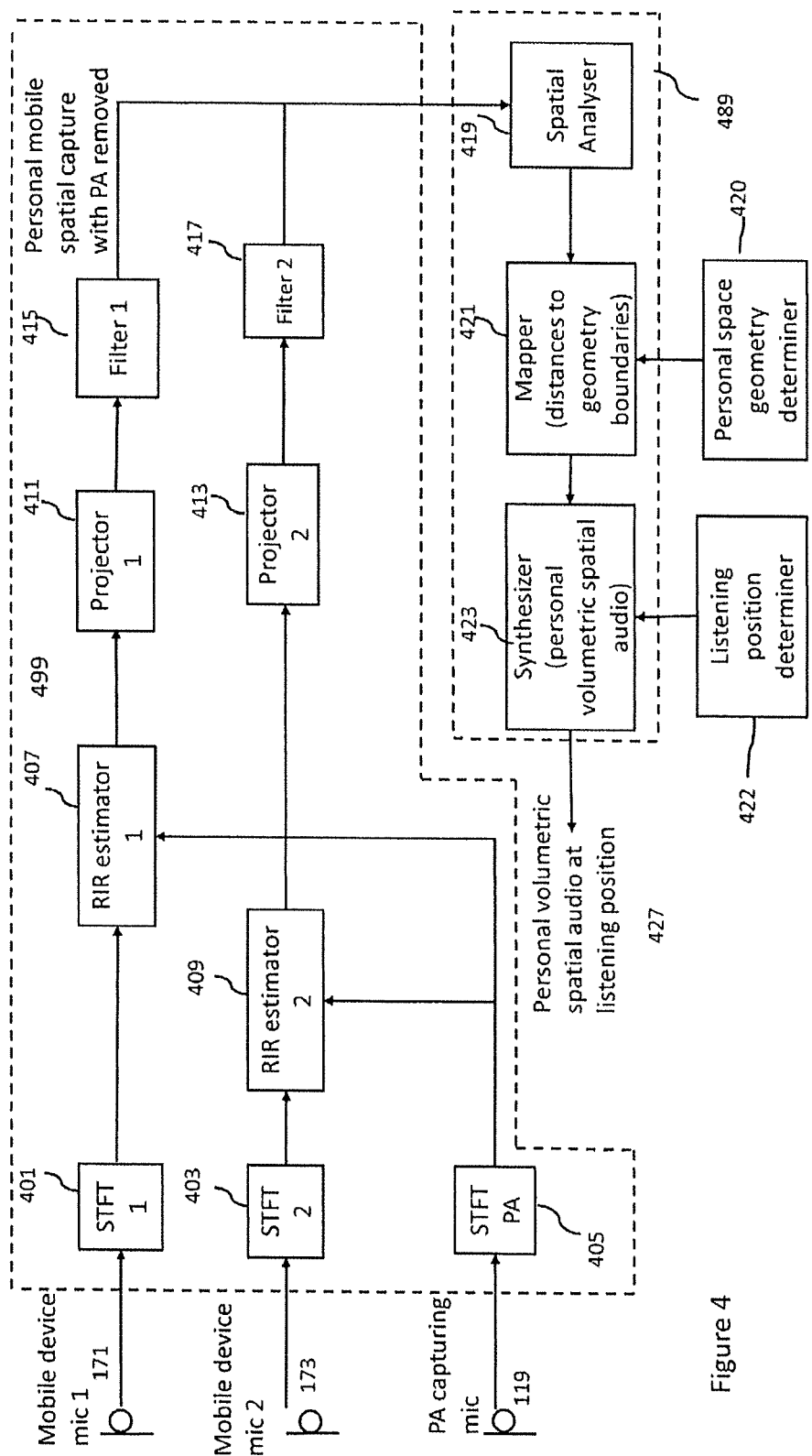
FIG. 4 shows schematically apparatus suitable for generating personal volumetric spatial audio as shown in FIG. 3 according to some embodiments.

In some embodiments the playback apparatus comprises a first common part determiner and remover 499. The first common part determiner and remover may be configured to process the personal spatial audio capture to determine a common part with respect to the professional audio capture and specifically with respect to the PA component of the professional audio capture. An example first common part determiner and remover 499 is shown in FIG. 4. In the example shown in FIG. 4 the inputs are shown as being the mobile device microphone 1 171, the mobile device microphone 2 172 and a PA capturing microphone, which in this example is shown as the array microphone 119. However any suitable personal capture apparatus microphone and PA capturing microphone input arrangement be used.

The first common part determiner and remover 499 may comprise suitable time-frequency domain transformers configured to receive the microphone audio signals and apply a suitable time to frequency domain transform such as a Short Time Fourier Transform (STFT) in order to convert the input time domain signals into a suitable frequency domain representation. Thus for example the mobile device microphone 1 input is coupled to STFT 1 401 which is configured to output a signal to room-impulse-response estimator 1 407. Also mobile device microphone 2 input is coupled to STFT 2 403 which is configured to output a signal to room-impulse-response estimator 2 409. Furthermore the PA capturing microphone input is coupled to STFT PA 405 which is configured to output a signal to both room-impulse-response estimator 1 407 and room-impulse-response estimator 2 409.

In some embodiments there may be optionally a time-alignment of the input audio signals. The time-alignment of the input audio signals may be performed by an aligner or similar configured to perform time alignment of the professional content and the personal content. This time alignment may be implemented where the audio signals cannot be time-synchronized based on time of capture information. The time-alignment may be based on known methods of audio cross correlation with the goal to align the personal audio content and professional audio content (to the same time line) so that they can be reproduced and/or mixed jointly.

The first common part determiner and remover 499 may comprise room-impulse-response estimators, shown in FIG. 4 by room-impulse-response estimator 1 407 associated with the mobile device microphone 1 input and room-impulse-response estimator 2 409 associated with the mobile device microphone 2 input. The room-impulse-response estimator 1 407 and room-impulse-response estimator 2 409 may be configured to estimate the room-impulse-responses (RIR's) from the representative microphone signals capturing the overall stage sound, such as the microphones capturing the PA, to the microphones of the personal audio capture device.

The room-impulse-response estimators may be configured to estimate the room-impulse-response (RIR) associated with the mobile device microphone signals and with respect to the acoustic properties of the area (for example the room, arena, etc) within which the experience is being captured.

The generation of the room-impulse-response from the mobile device microphone audio signal and the array microphone audio signal may be achieved in any suitable manner. For example in some embodiments the generation of the RIR may be achieved by the following operations:

Receiving the audio signals (e.g. from the mobile device microphone and from the microphone array);

(optionally) Determining the location of the mobile device microphone (for example from the position determiner and/or from analysis of the audio signals from the mobile device microphone and the microphone array);

Performing a block-wise linear least squares (LS) projection (for example in offline operation) or recursive least squares (RLS) algorithm (for example in either real time or offline operation) to obtain a set of RIR filters in the time-frequency domain.

The Block-wise linear least squares projection may for example be generated in some embodiments by generating a RIR as a projection operator from the PA capturing microphone signal (i.e. the "dry" audio signal) to the mobile device microphone audio signal array audio signal space (i.e. the "wet" audio signals).

The projection is time, frequency and channel dependent. The parameters the of RIR can be estimated using a linear least squares (LS) regression, which is equivalent to finding the projection between the PA capturing microphone signal (near-field) and the mobile device microphone audio signal (far-field) spaces.

The method of LS regression for estimating RIR values may be applied for moving sound sources by processing the input signal in blocks of approximately 500 ms and the RIR values may be assumed to be stationary within each block. Block-wise processing with moving sources assumes that the difference between RIR values associated with adjacent frames is relatively small and remains stable within the analysed block. This is valid for sound sources that move at low speeds in an acoustic environment where small changes in source position with respect to the receiver do not cause substantial change in the RIR value.

The method of LS regression may be applied individually for each PA capturing microphone (source) audio signal in each channel of the mobile device. Additionally, the RIR values are frequency dependent and each frequency bin of the STFT is processed individually. Thus, in the following discussion it should be understood that the processing is repeated for all channels and all frequencies.

Assuming a block of STFT frames with indices t, . . . , t+T where the RIR is assumed stationary inside the block, the mixture signal STFT with the convolutive frequency domain mixing can be given as:

$$y = Xh$$

wherein y is a vector of mobile device microphone (far-field) STFT coefficients from frame t to t+T;

X is a matrix containing the microphone array (near-field) STFT coefficients starting from frame t−0 and the delayed versions starting from t−1, . . . , t−D−1; and h is the RIR to be estimated.

The length of the RIR filter to be estimated may be D STFT frames. The block length is T+1 frames, and T+1>D in order to avoid overfitting due to an overdetermined model.

The above equation can be expressed as:

$$\begin{bmatrix} y_t \\ y_{t+1} \\ \vdots \\ y_{t+T} \end{bmatrix} = \begin{bmatrix} x_t & x_{t-1} & \cdots & x_{t-(D-1)} \\ x_{t+1} & x_t & \cdots & x_{t+1-(D-1)} \\ \vdots & \vdots & \ddots & \vdots \\ x_{t+T} & x_{t+T-1} & \cdots & x_{t+T-(D-1)} \end{bmatrix} \begin{bmatrix} h_0 \\ h_1 \\ \vdots \\ h_{D-1} \end{bmatrix}$$

and assuming that data before the first frame index t is not available, the model becomes:

$$\begin{bmatrix} y_t \\ y_{t+1} \\ \vdots \\ y_{t+T} \end{bmatrix} = \begin{bmatrix} x_t & 0 & \cdots & 0 \\ x_{t+1} & x_t & \cdots & 0 \\ \vdots & \vdots & \ddots & \vdots \\ x_{t+T} & x_{t+T-1} & \cdots & x_{t+T-(D-1)} \end{bmatrix} \begin{bmatrix} h_0 \\ h_1 \\ \vdots \\ h_{D-1} \end{bmatrix}$$

The linear LS solution minimization is:

$$\min \sum_t \left( y_t - \sum_{d=0}^{D-1} x_{t-d} h_d \right)^2 = \min \|y - Xh\|^2$$

is achieved as:

$$h = (X^T X)^{-1} X^T y$$

In some embodiments, the RIR data may be collected during the performance itself by truncating the analysis block of the block-wise least squares process outlined above to the current frame and estimate new filter weights for each frame. Additionally, the block-wise strategy in real-time operation requires constraining the rate of change in RIR filter parameter between adjacent frames to avoid rapid changes in the projected signals. Furthermore, the truncated block-wise least squares process requires inversing the autocorrelation matrix for each new frame of data.

In some embodiments, real-time RIR estimation may be performed by using a recursive least squares (RLS) algorithm. The modelling error for timeframe t may be specified as:

$$e_t = y_t - \hat{x}_t$$

where $y_t$ is the observed/desired mixture signal.

The cost function to be minimized with respect to filter weights may be expressed as:

$$C(h_t) = \Sigma_{i=0}^t \lambda^{t-1} e_i^2, 0 < \lambda < 1$$

which accumulates the estimation error from past frames with exponential weight $\lambda^{t-1}$. The weight of the cost function can be thought of as a forgetting factor which determines how much past frames contribute to the estimation of the RIR filter weights at the current frame. RLS algorithms where $\lambda < 1$ may be referred to in the art as exponentially weighted RLS and $\lambda = 1$ may be referred to as growing window RLS.

The RLS algorithm minimizing $C(h_t) = \Sigma_{i=0}^t \lambda_i^2 e_i^2$, $0 < \lambda < 1$ is based on recursive estimation of the inverse correlation matrix $P_t$ of the close-field signal and the optimal filter weights $h_t$ and can be summarized as:

Initialization:

$$h_0 = 0$$

$$P_0 = \delta^{-1} I$$

Repeat for t=1, 2, . . .

$$\alpha_t = y_t - x_t^T h_{t-1}$$

$$g_t = P_{t-1} x_t^* \frac{1}{\lambda + x_t^T P_{t-1} x_t^*}$$

$$P_t = \frac{1}{\lambda P_{t-1}} - \frac{1}{\lambda g_t x_t^T P_{t-1}}$$

$$h_t = h_{t-1} + \alpha_t g_t$$

The initial regularization of the inverse autocorrelation matrix is achieved by defining δ using a small positive constant, typically from $10^{-2}$ to $10^1$. A small δ value causes faster convergence, whereas a larger δ value constrains the initial convergence to happen over a longer time period (for example, over a few seconds).

The contribution of past frames to the RIR filter estimate at current frame t may be varied over frequency. Generally, the forgetting factor λ acts in a similar way as the analysis window shape in the truncated block-wise least squares algorithm. However, small changes in source position can cause substantial changes in the RIR filter values at high frequencies due to highly reflected and more diffuse sound propagation path. Therefore, the contribution of past frames at high frequencies needs to be lower than at low frequencies. It is assumed that the RIR parameters slowly change at lower frequencies and source evidence can be integrated over longer periods, meaning that the exponential weight $\lambda^{t-i}$ can have substantial values for frames up to 1.5 seconds in past.

A similar regularization as described above with reference to block-wise LS may also be adopted for the RLS algorithm. The regularization is done to achieve a similar effect as in block-wise LS to improve robustness towards low-frequency crosstalk between near-field signals and avoid excessively large RIR weights. The near-field microphones are generally not directive at low frequencies and can pick up fair amount of low-frequency signal content generated by noise source, for example traffic, loudspeakers etc.

In order to specify regularization of the RIR filter estimates, the RLS algorithm is given in a direct form. In other words, the RLS algorithm is given without using a matrix inversion lemma to derive updates directly to the inverse autocorrelation matrix $P_t$ but for the autocorrelation matrix $R_t$ ($R_t^{-1} = P_t$). The formulation can be found for example from T. van Waterschoot, G. Rombouts, and M. Moonen, "*Optimally regularized recursive least squares for acoustic echo cancellation,*" in Proceedings of The second annual IEEE BENELUX/DSP Valley Processing Symposium (SPS-DARTS 2006), Antwerp, Belgium, 2005, pp. 28-29.

The direct form RLS algorithm updates are specified as,
Initialization:

$$h_0 = 0$$

$$R_0 = \delta^{-1} I$$

Repeat for t=1, 2, . . .

$$\alpha_t = y_t - x_t^T h_{t-1}$$

$$R_t = \lambda R_{t-1} + x_t^* x_t^T$$

$$h_t = h_{t-1} + R_t^{-1} x_t^* \alpha_t$$

This algorithm would give the same result as the RLS algorithm discussed above but requires operation for calculating the inverse of the autocorrelation matrix, and is thus computationally more expensive, but does allow regularization of it. The autocorrelation matrix update with Levenberg-Marquardt regularization (LMR) according to T. van Waterschoot, G. Rombouts, and M. Moonen, "*Optimally regularized recursive least squares for acoustic echo cancellation,*" in Proceedings of The second annual IEEE BENELUX/DSP Valley Processing Symposium (SPS-DARTS 2006), Antwerp, Belgium, 2005, pp. 28-29 is:

$$R_t = \lambda R_{t-1} + x_t^* x_t^T + (1-\lambda) \beta_{LMR} I$$

where $\beta_{LMR}$ is obtained from the regularization kernel $k_f$ increasing towards low frequencies weighted by the inverse average log-spectrum of the close-field signal ($1-e_f$) as discussed above with respect to the block-wise LS algorithm.

Another type of regularization is the Tikhonov regularization (TR), as also introduced in the case of block-wise LS, which can be defined for the RLS algorithm as:

$$R_t = \lambda R_{t-1} + x_t^* x_t^T + (1-\lambda) \beta_{TR} I$$

$$h_t = h_{t-1} + R_t^{-1} (x_t^* \alpha_t + (1-\lambda) \beta_{TR} h_{t-1})$$

Similarly as before, $\beta_{TR}$ is based on the regularization kernel and the inverse average log-spectrum of the close-field signal. It should be noted that the kernel $k_f$ needs to be modified to account for the differences between block-wise LS and RLS algorithms, and can depend on the level difference between the close-field signal and the far-field mixtures.

In addition to regularization weight being adjusted based on the average log-spectrum, it can also be varied based on the RMS level difference between near-field and far-field signals. The RMS levels of these signals might not be calibrated in real-time operation and thus additional regularization eight strategy is required. A trivial low-pass filter applied to RMS of each individual STFT frame can be used to track the varying RMS level of close-field and far-field signals. The estimated RMS level is used to adjust the regularization weights $\beta_{LMR}$ or $\beta_{TR}$ in order to achieve similar regularization impact as with RMS calibrated signals assumed in earlier equations.

The room-impulse-response estimator 1 407 and room-impulse-response estimator 2 409 may be configured to output the estimated room-impulse-responses (RIR's) to associated projectors. Thus for example room-impulse-response estimator 1 407 may be configured to output the estimated room-impulse-response (RIR) associated with the mobile device microphone 1 input and PA microphone input to a projector 411. Similarly room-impulse-response estimator 2 409 may be configured to output the estimated room-impulse-response (RIR) associated with the mobile device microphone 2 input and PA microphone input estimate the room-impulse-responses (RIR's) to a projector 2 413.

The first common part determiner and remover 499 may comprise projectors, shown in FIG. 4 as projector 1 411 configured to receive the output from RIR estimator 1 407 and projector 2 413 configured to receive the output from RIR estimator 2 409. The projectors are configured to determine 'wet' projections of the PA signals which may be passed to a set of filters.

The projector 1 thus applies the determined or identified room impulse response filter to the 'dry' PA microphone audio signal to project the near-field audio signal into a far-field space and thus generate a 'wet' projection of the PA microphone audio signal. The projection audio signal may be passed to a filter within the set of filters.

For example the projected 'wet' audio signal for a single block can be trivially obtained as:

$$\hat{x}_t = \sum_{d=0}^{D-1} x_{t-d} h_d$$

$$\hat{x}_t^{(p)} = \sum_{d=0}^{D-1} x_{t-d}^{(p)} h_d^{(p)}$$

The first common part determiner and remover 499 may comprise filters, shown in FIG. 4 as filter 1 415 configured to receive the output of projector 1 411 and filter 2 configured to receive the output of projector 2 413. The filters are configured to subtract the output of the projectors from the personal audio capture inputs and pass these to a spatial analyser as part of a parametric processor 489.

The removal of a particular 'wet' projection of the PA microphone audio signal from the mobile device microphone signals is a simple subtraction:

$$\hat{y}_t = y_t - \hat{x}_t$$

This residual audio signal may then be output.

The operation of removing the common part from the personal spatial audio is shown in FIG. 3 by step 305.

In some embodiments the playback apparatus comprises a personal space geometry determiner 420. The personal space geometry determiner 420 may in some embodiments be configured to receive information from at least one playback apparatus sensor. Example sensors may be for example a time or phase based laser ranging sensor, a pair of cameras or light field camera from which information can be used to define a depth map from the point of view of the listener. From the depth map the personal space geometry determiner 420 may be configured to generate an overall room geometry from the point of view of the listener.

The operation of determining a listening or personal space geometry is shown in FIG. 3 step 307.

The personal space geometry determiner 420 may furthermore determine an area suitable for the presentation of the personal audio capture. Thus for example as shown in FIG. 2, around the listening user's current location the personal space geometry determiner 420 may be configured to determine an area suitable for defining the listening space area and specifically the listening area associated with the personal capture space area. The area may, as shown in FIG. 2, be the corners of a sofa or the boundaries of a carpet. If there are no suitable physical boundaries detected near the user, then the system determines some arbitrary shape boundaries (such as a bounding cube) around the user's current location.

The personal space geometry determiner 420 may output this information to the mapper 421.

The operation of determining an area for the personal volumetric audio is shown in FIG. 3 by step 309.

In some embodiments the playback apparatus comprises a listening position determiner 422. The listening position determiner 422 may be configured to determine the user's current location and orientation and output this information to a synthesizer 423 within the parametric processor 489.

In some embodiments the playback apparatus comprises a parametric processor 489. The parametric processor 489 may in some embodiments comprise a spatial analyser 419. The spatial analyser 419 may be configured to receive the audio signals representing the mobile device microphone content with the common PA content removed. In other words the input to the spatial analyser is the personal mobile spatial capture with the PA components removed.

The spatial analyser 419 may be configured to receive these audio signals and analyse them to determine personal space perceptually relevant parameters in frequency bands, for example, the directionality of the propagating sound at the recording position.

These parameters may comprise direction of arrival (DOA) parameters, energy ratios, and distances. For example in some embodiments the analyser is configured to generate parameters on a frequency band by frequency band basis for: the direction-of-arrival (DOA) (azimuth: $\theta(k,n)$, and elevation: $\varphi(k,n)$), the direct-to-total energy ratio $r(k,n)$, and the distance $d(k,n)$ (where k is the frequency band and n is the temporal frame index).

In some embodiments, these parameters may then be associated with the audio signals.

The parameters may be output by the spatial analyser 419 and passed to a mapper 421.

In some embodiments the parametric processor 489 may in some embodiments comprise a mapper 421.

The mapper 421 may be configured to receive the audio signal parameters and particularly the distances from the spatial analyser 419 and furthermore the area suitable for the presentation of the personal audio capture from the personal space geometry determiner 420. The mapper 421 may then be configured to map the distances from the spatial analyser 419 within the area suitable for the presentation of the personal audio capture and output the mapped distance to the synthesizer 423. In other words to be able to synthesize a volumetric spatial audio signal where the listening position is changed, we need the position for each frequency band signal. If the position is known, the new position given a translation in the listening position can be calculated using trigonometry.

The personal spatial audio parameterization is thus made volumetric by mapping the content of each frequency band to a boundary in the area suitable for the presentation of personal audio capture as determined by the personal space geometry determiner. Instead of mapping to a boundary, the system may map the frequency bands to any suitable locations in the area suitable for the presentation of personal audio. These may be, for example, suitable locations off the boundaries, or may be locations determined to be within a convenient distance from an initial user position.

In some embodiments the parametric processor 489 comprises a synthesizer 423. Although in this example the synthesis is performed within the parametric processor it is understood that the synthesis may be performed on a different device and/or at a different time to the other processing aspects. Thus, one device or a first software process at a first time prepares the content by implementing processing up to the point of mapping to scene geometry, and another device or another software process at a different time is configured to obtain the user position and performs volumetric audio synthesis.

The synthesizer 423 is configured to receive, retrieve or otherwise obtain the audio signals and the analysis determined parameters which may be in the form of estimated direction, energy ratio and mapped distance parameters. Furthermore the synthesizer 423 may be further configured to receive the listening position/orientation parameters, for example head orientation and translation signals, from the listening position determiner 422.

The synthesizer 423 is then configured to perform synthesis to process the received audio signals based on the associated parameters, such as the directions, energy ratio and mapped distance and furthermore based on the received head orientation and translation signal parameters to generate a suitably rendered personal volumetric spatial audio at the listening position.

The synthesis may be performed in a manner similar to that described in GB patent application number 1710093.4. As a result, a volumetric personal audio space is created at the user's sofa. The synthesizer 423 is configured to generate the spatial audio using the captured multimicrophone signals and the analyzed metadata (bandwise DOA and distance, direct-to-ambient ratio, and delays maximizing coherence between bands).

The personal volumetric spatial audio 427 may in some embodiments be passed to a mixer 601.

The operation of generating a personal volumetric audio signal is shown in FIG. 3 by step 311.

Having generated a personal volumetric audio signal in some embodiments a professional volumetric audio signal may furthermore be generated.

Figure 5:
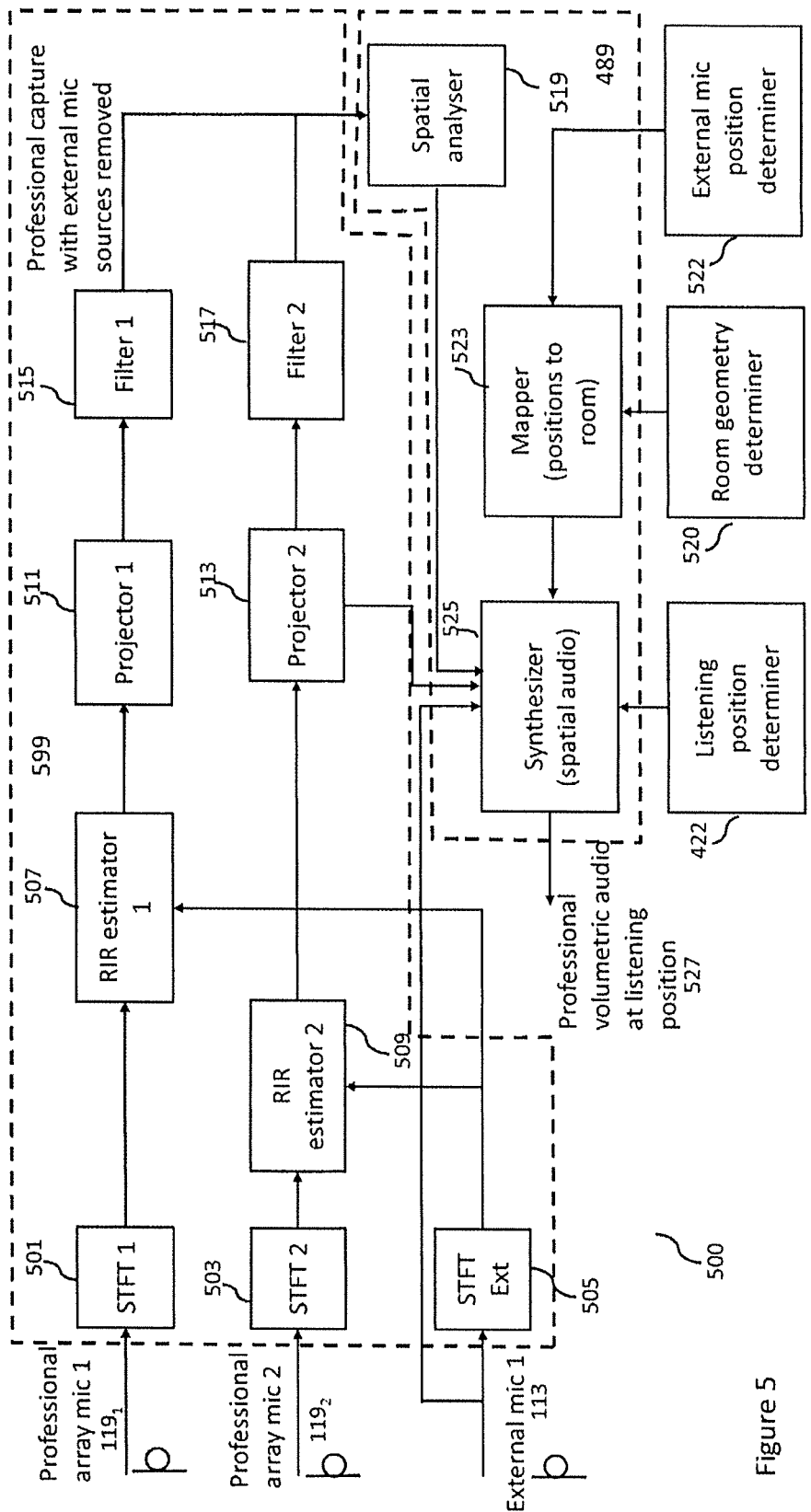
FIG. 5 shows schematically apparatus suitable for generating professional volumetric spatial audio as shown in FIG. 3 according to some embodiments.

With respect to FIG. 5 apparatus suitable for generating the professional volumetric audio signal is shown. In some embodiments the playback apparatus thus comprises a professional volumetric audio generator 500. The professional volumetric audio generator 500 may thus comprises a common part determiner and remover 599. The common part determiner and remover 599 may be configured to process the professional spatial audio capture to determine a common part with respect to the external microphone capture. An example common part determiner and remover 599 is shown in FIG. 5 with inputs as being a professional array microphone 1 119$_1$, professional array microphone 2 119$_2$ and the external microphone 1 113, for example, worn by the performer 1 103. However any suitable professional capture apparatus microphone and external microphone may be used.

The common part determiner and remover 599 may comprise suitable time-frequency domain transformers configured to receive the microphone audio signals and apply a suitable time to frequency domain transform such as a Short Time Fourier Transform (STFT) in order to convert the input time domain signals into a suitable frequency domain representation. Thus for example the professional array microphone 1 input is coupled to STFT 1 501 which is configured to output a signal to room-impulse-response estimator 1 507. Also professional array microphone 2 input is coupled to STFT 2 503 which is configured to output a signal to room-impulse-response estimator 2 509. Furthermore the external microphone input is coupled to STFT Ext 505 which is configured to output a signal to both room-impulse-response estimator 1 507 and room-impulse-response estimator 2 509.

The common part determiner and remover 599 may comprise room-impulse-response estimators, shown in FIG. 5 by room-impulse-response estimator 1 507 associated with the professional array microphone 1 input and room-impulse-response estimator 2 509 associated with the professional array microphone 2 input. The room-impulse-response estimator 1 507 and room-impulse-response estimator 2 509 may be configured to estimate the room-impulse-responses (RIR's) from the representative microphone signals capturing the performer sound such as the voice of a singer to the microphones of the professional capture array. These room-impulse-response estimators may be configured to perform similar processes to the previously described room-impulse-response-estimators but with respect to the 'dry' external microphone audio content and the 'wet' external microphone audio content as experienced by the microphone array.

The room-impulse-response estimator 1 507 and room-impulse-response estimator 2 509 may be configured to output the estimated room-impulse-responses (RIR's) to associated projectors. Thus for example room-impulse-response estimator 1 507 may be configured to output the estimated room-impulse-response (RIR) associated with the professional array microphone 1 input and external microphone input to a projector 1 511. Similarly room-impulse-response estimator 2 509 may be configured to output the estimated room-impulse-response (RIR) associated with the professional array microphone 2 input and external microphone input estimate the room-impulse-responses (RIR's) to a projector 2 513.

The common part determiner and remover 599 may comprise projectors, shown in FIG. 5 as projector 1 511 configured to receive the output from RIR estimator 1 507 and projector 2 513 configured to receive the output from RIR estimator 2 509. The projectors are configured to determine 'wet' projections of the external microphone signals which may be passed to a set of filters. Similarly the projectors may be configured to perform similar processes to the previously described projectors but with respect to the 'dry' external microphone audio content and the 'wet' external microphone audio content as experienced by the microphone array.

The common part determiner and remover 599 may comprise filters, shown in FIG. 5 as filter 1 515 configured to receive the output of projector 1 511 and filter 2 configured to receive the output of projector 2 513. The filters are configured to subtract the output of the projectors from the professional audio capture inputs and pass these to a spatial analyser as part of a parametric processor 589.

In some embodiments the professional volumetric audio generator 500 comprises a professional space/room geometry determiner 520. The professional space/room space geometry determiner 520 may in some embodiments be configured to receive information from the at least one playback apparatus sensor. From the depth map the professional space/room space geometry determiner 520 may be configured to generate an overall room geometry from the point of view of the listener. The professional space/room space geometry determiner 520 may furthermore determine an area suitable for the presentation of the professional audio capture. Thus for example as shown in FIG. 2, around the listening user's current location the professional space/room space geometry determiner 420 may be configured to determine an area suitable for defining the listening space area and specifically the listening area associated with the professional capture space area. The area may, as shown in FIG. 2, be the area set by the room walls. If there are no suitable physical boundaries detected at a suitable distance from the user, then the system may determine some arbitrary shape boundaries (such as a bounding cube) from within a suitable distance from the user's current location. In other words this is attempting to find a position to 'display' the professional capture. Thus if the capture event is a concert it should be away from the user and not immediately around him or her. A natural place for the 'personal' capture would however be surrounding the user.

The professional space/room space geometry determiner 520 may output this information to the mapper 521.

In some embodiments the professional volumetric audio generator 500 comprises an external microphone position determiner. The external microphone positon determiner 522 may be configured to determine a location of the external microphones, for example the location of the performer and his microphone in the performance area. This information may be passed to the mapper 523.

In some embodiments the professional volumetric audio generator 500 comprises a listening position determiner 422. The listening position determiner 422 may as described with respect to the personal capture apparatus be configured to determine the user's current location and orientation and output this information to a synthesizer 523 within the parametric processor 589.

In some embodiments professional volumetric audio generator 500 comprises a parametric processor 589. The parametric processor 589 may in some embodiments comprise a spatial analyser 519. The spatial analyser 519 may be configured to receive the audio signals from the common part determiner (in other words the professional capture microphone content with the closeup or external microphone content removed).

The spatial analyser 519 may be configured to receive these audio signals and analyse them to determine perceptually relevant parameters in frequency bands, for example, the direction of arrival of the propagating sound at the recording position.

These parameters may comprise direction of arrival (DOA) parameters, energy ratios, and distances. For example in some embodiments the analyser is configured to generate parameters on a frequency band by frequency band basis for: the direction-of-arrival (DOA) (azimuth: $\theta(k,n)$, and elevation: $\varphi(k,n)$), the direct-to-total energy ratio $r(k,n)$, and the distance $d(k,n)$ (where k is the frequency band and n is the temporal frame index).

In some embodiments, these parameters may then be associated with the audio signals.

The parameters may be output by the spatial analyser 519 and passed to the mapper 521.

In some embodiments the parametric processor 589 may in some embodiments comprise the mapper 521.

The mapper 521 may be configured to receive the audio signal parameters and particularly the distances from the spatial analyser 519 and furthermore the area suitable for the presentation of the professional audio capture from the room geometry determiner 520. The mapper 521 may then be configured to map the distances from the spatial analyser 519 within the area suitable for the presentation of the professional audio capture and output the mapped distance to the synthesizer 523. In other words to be able to synthesize a volumetric spatial audio signal where the listening position is changed, we need the position for each frequency band signal. If the position is known, the new position given a translation in the listening position can be calculated using trigonometry.

The professional spatial audio parameterization is thus made volumetric by mapping the content of each frequency band to a boundary in the area suitable for the presentation of professional audio capture as determined by the room geometry determiner and the external microphone determiner.

In some embodiments the parametric processor 589 comprises a synthesizer 523. The synthesizer 523 is configured to receive, retrieve or otherwise obtain the audio signals and the analysis determined parameters which may be in the form of estimated direction, energy ratio and mapped distance parameters. Furthermore the synthesizer 523 may be further configured to receive the listening position/orientation parameters, for example head orientation and translation signals, from the listening position determiner 422.

The synthesizer 523 is then configured to perform synthesis to process the received audio signals based on the associated parameters, such as the directions, energy ratio and mapped distance and furthermore based on the received head orientation and translation signal parameters to generate a suitably rendered personal volumetric spatial audio at the listening position.

The synthesis may be implemented as a result of positioning the external microphone sources with regard to a reference point of capture, such as the (OZO) microphone array positioning as discussed herein. The position may comprise an azimuth, elevation, distance relative to the reference point. Also in some embodiments the microphone (OZO) array is positioned and its orientation is obtained.

In a manner similar to that described previously the room impulse responses (RIR) from each external microphone sources to the array microphones may be estimated. Using the estimated RIR's, 'wet' projections of each external microphone source at each array microphone location may be calculated. Then using filters such as described above the wet projections of external microphone captured sources can be subtracted from the array microphone signals to create a (diffuse) residual signal.

Furthermore using at least one of the wet projections of an external microphone signal, the dry microphone signal and the (diffuse) residual audio signal a volumetric audio scene can be created. The dry microphone signal and wet projection may in some embodiments be spatially positioned with regards to the user's current listening point, while applying distance-gain-attenuation to the dry signal part.

The synthesizer may for example comprise a relative position determiner configured to receive the external microphone position and/or orientation and the listener position and/or orientation and be configured to determine the external microphone (audio source) position with respect to the listener. In some embodiments this may be performed in two stages. The first stage is one of recalculating the external microphone (or source) position taking into account the listener translation. The second stage is one of determining the external microphone position with respect to the listener (for example the head) orientation. Thus given a listener position and external microphone (source) position in Cartesian coordinates (x, y, z), the system first calculates the external microphone (source) position in polar coordinates (azimuth, elevation, distance) with respect to the current listener position.

In some embodiments the synthesizer comprises audio signal distance/gain attenuators configured to receive the 'dry' and 'wet' source audio signals and the residual audio signal as well as the relative position/orientation.

In some embodiments the 'dry' and 'wet' audio signal distance/gain attenuator parts are configured to adjust the gain for the 'dry' source (external microphone) audio signal relative to the projected audio signal. For example, in some embodiments the 'dry' audio signal gain may be set such that it is inversely proportional to the distance, that is, gain=1.0/distance. The gain of the residual audio signal may be kept constant at all listening positions or at a certain listening position range. If the user goes beyond the listening area, then the gain of the residual audio signal may also be attenuated depending on the distance of the listener from the mapped position of the residual signal capture microphone array. In other words the gains may be set such that the wet residual maintains the same gain as long as the user is within the listening area. If the user goes away, to another room for example, the gain of the wet residual starts to decrease depending on the distance moved.

In some embodiments the distance/gain attenuation for the wet projection and the diffuse residual may have an effect only when the listener is farther than a predefined threshold from the capture setup. The threshold may be defined by defining a boundary around the capture apparatus (for example relative to the microphone array position), which may correspond to, for example, to the locations of physical walls where the capture was done. Alternatively in some embodiments it might be an artificial boundary. When the listener is outside this boundary, distance/gain attenuation is applied as gain=1/sqrt(distance_from_boundary).

In some embodiments the synthesizer comprises a spatial extent processor configured to receive the outputs of the audio signal distance/gain attenuator and the position/orientation information. The spatial extent processor may be configured to perform two actions on the audio signals. Firstly, spatially position the external microphone (source) given the azimuth and elevation from the listener. Secondly, control the spatial extent (width or size) of the external microphone sources and the residual environmental audio signals as necessary. For example the 'dry' projection of the external microphone audio signal is processed such that the audio signal is reproduced with a larger spatial extent (in other words with a spatial extent larger than 0 degrees, for example, 45 degrees) when the external microphone (source) is close to the listener but is reproduced with a narrowing extent after a certain distance threshold is reached. In some embodiments the spatial extent for the source at a certain distance is determined based on assigned dimensions and/or size parameters for the sound source, so that sound appears to emanate from an area corresponding to the defined shape/size of the sound source. In some embodiments the narrowing can be configured to be gradual and may in some embodiments linearly follow the energy of the 'dry' projection of the external microphone audio signal. For example the transform may be linearly based on the change so that after another threshold the spatial extent of the 'dry' projection of the external microphone audio signals is point-like.

In some embodiments the 'wet' spatial extent processing is configured to process the 'wet' external microphone audio signals such that it is constant and independent of distance. In some other embodiments the spatial extent may be set for a determined or threshold distance, for example set to 180 degrees. The spatial extent may then be made narrower when it is closer and broadened when it is further.

The processor may be configured in some embodiments to achieve this in a more natural solution if a virtual volume (i.e., size) is given to the source and then the spatial extent represents the largest angle between all vectors from the listening point to the edges of the virtual volume. In some embodiments this the spatial extent may be corrected with a predefined spatial extent correction factor so that the perceived extent corresponds to the size of the object.

In some embodiments, the residual audio signal may be optionally processed such that the residual audio signal is spatially extended to 360 degrees or other suitable amount. In this case, spatial analyser 519 does not need to be utilized to process the residual audio signal. In addition to spatially extending the residual audio signal, this spatial extension effectively removes the directionality from the residual audio signal. As the directionality is removed along with the most dominant sources, the residual audio signals comprise mostly diffuse ambiance audio signals and any change to the listener's position does not change the audio signal, except when the listener's position is very far from the capture. At such 'extreme' distances and thus when the listener to source distance is greater than a 'far' threshold the spatial extent may be configured to start to decrease the spatial extent proportionally to the distance. For example, the spatial extent may be scaled by the inverse of the distance from the limit where it starts to decrease.

The output from the spatial extent processor may be in a spatial format. For example the output of the processors may be in a loudspeaker (such as 4.0) format.

In some embodiments synthesizer comprises a combiner configured to receive the outputs from the spatial extent processor and provide a combined or summed output.

The synthesizer in some embodiments comprises a binaural renderer configured to receive the output of the combiner and the listener head orientation (for example from the head tracker). A binaural rendering of the combined audio signals takes into account the user head orientation (yaw, pitch, roll) and determines the appropriate head-related-transfer-function (HRTF) filters for the left and right ear for each loudspeaker channel, and creates a signal suitable for headphone listening. Thus the binaural renderer may be configured to output the renderer audio signal to the listener (and headphones).

In some embodiments the synthesis may be performed in a manner similar to that described in GB patent application number 1710093.4. As a result, a volumetric professional audio space is created in the area determined to be suitable for the professional part of the content. The synthesizer 523 is configured to generate the spatial audio using the captured multi-microphone signals and the analysed metadata (band-wise DOA and distance, direct-to-ambient ratio, and delays maximizing coherence between bands).

The professional volumetric spatial audio 527 may in some embodiments be passed to a mixer 601.

The operation of generating a professional volumetric audio by modifying the sound source location data of the professional capture is shown in FIG. 3 by step 313.

In some embodiments the playback apparatus comprises a mixer 601. An example of the mixer is shown in FIG. 6.

Figure 6:
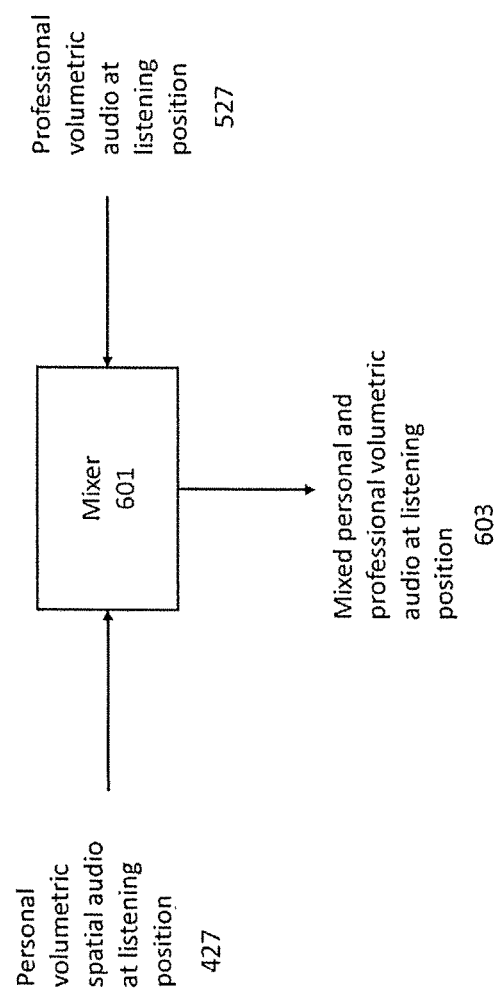
FIG. 6 shows schematically apparatus suitable for combining the professional volumetric spatial audio and personal volumetric spatial audio as shown in FIG. 3 according to some embodiments.

FIG. 6 thus shows the mixer 601 configured to receive the personal volumetric spatial audio at the listening position 427 and the professional volumetric audio at the listening position 527 and configured to output a mixed personal and professional volumetric spatial audio at the listening position 603. In other words after synthesizing the professional volumetric audio and the personal volumetric audio, the system may sum them together to create a combined audio scene. Thus, as a result the user will hear the concert reproduced in high quality volumetric spatial audio scene, which enables them to change their listening position. Combined to this professional audio is the personal spatial audio capture, which is best audible at the sofa location (or whatever portion of the room was determined for it). When the user is in the personal area, as a result of the proposed rendering the user will be surrounded by the sounds of his friends, while the professional band plays further away. If the user moves away from the personal space towards the band, the music of the band will start to dominate and the voices of the user's friends will be attenuated because of distance-gain attenuation applied to the personal volumetric space.

In some embodiments, another personal volumetric experience, for example, captured by another person, may be combined to the combined experience. The processing for the other personal experience is the same, and its sound positions are mapped to another suitable location in the space. The location may be, for example, next to the sofa. Furthermore, the user may be able to interact with the other personal volumetric audio so that the listening user can move it to reposition the user in the middle, or reposition the volumetric audio to the position of the sofa. In this case, either the two personal volumetric audio scenes are mixed enabling the user to hear a combination of the sounds in the both captures, or the first personal volumetric audio scene is silenced while the second is positioned spatially at the same position (on the sofa).

The mixed personal and professional volumetric spatial audio may then be output to the suitable VR/AR audio output device such as a set of headphones wirelessly or otherwise coupled to the VR/AR device.

The operation of mixing professional and personal volumetric audio to experience content is shown in FIG. 3 by step 315.

Figure 7:
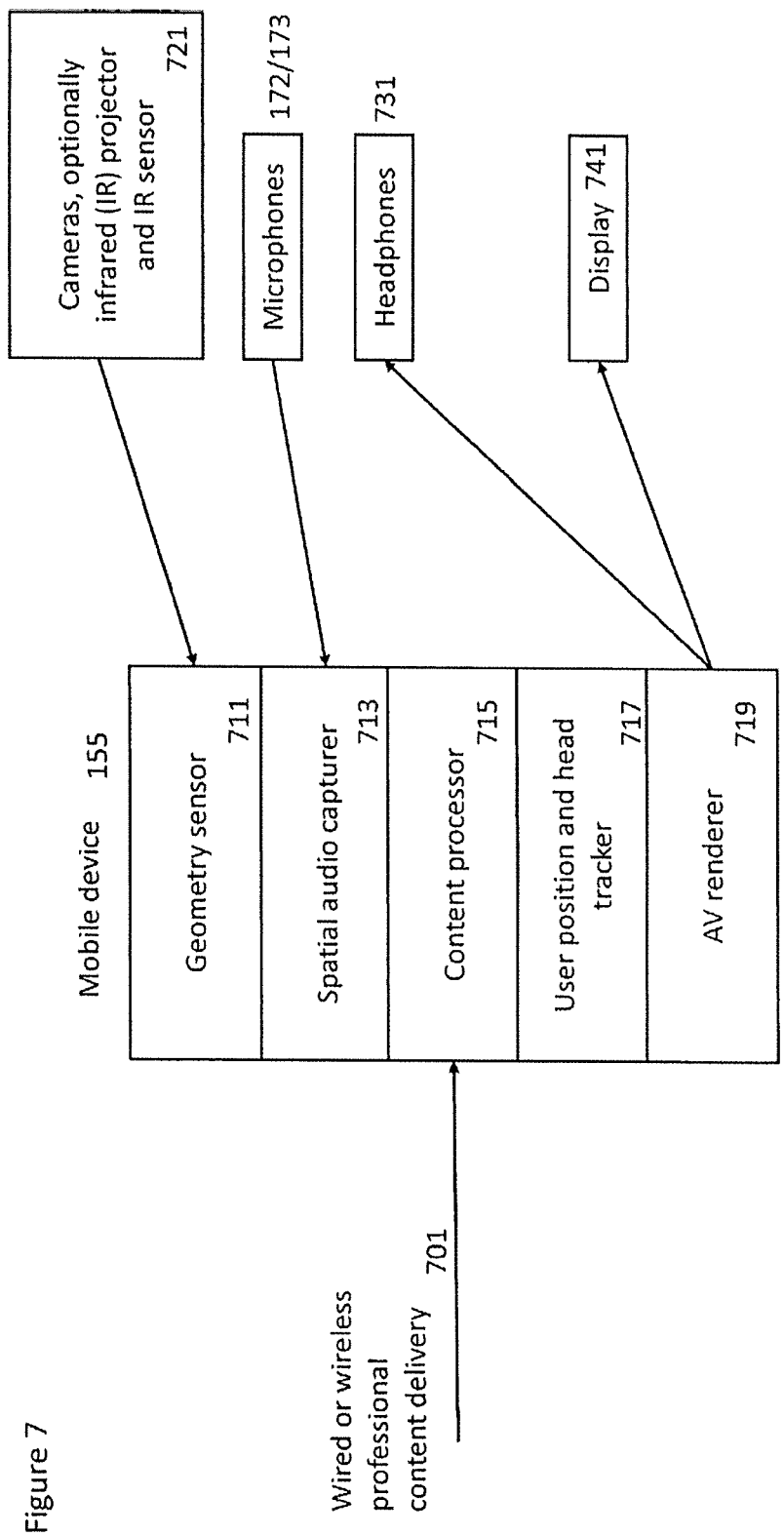
FIG. 7 shows schematically a mobile device suitable for reproducing the volumetric spatial audio according to some embodiments.

With respect to FIG. 7 an example device 155 which may be used to implement some embodiments is shown.

The example mobile device 155 may thus be comprise of be coupled to microphones 172/173 which pass personal capture audio signals to the spatial audio capturer 713.

In addition to spatial audio capture, the mobile device may comprise geometry sensors 711 or be coupled to sensors such as cameras and optionally infrared projector and infrared sensors.

The mobile device may further comprise a content processor 715 configured to receive wired or wireless professional content as well as the spatial audio input from the personal content.

In addition, the mobile device contains methods to execute at least the personal spatial audio capture, content scaling, and content rendering parts of the invention.

Furthermore in some embodiments the mobile device comprises a user position and head tracker 717 configured to perform head tracking processing (for example using in-built inertial sensors).

In some embodiments the mobile device further comprises AV rendering elements 791 configured to output video images for example to a display 741 optionally connected to a head mounted device (HMD) and audio to headphones 731.

In implementing embodiments scaling a volumetric audio scene can be achieved so that it can be conveniently experienced in a normal living room. Furthermore embodiments may enable creating a personal volumetric audio scene at some sub-portion of the living room and combine these two for creating a novel, combined volumetric experience combining two volumetric captures.

Furthermore by employing such embodiments the apparatus and methods enable sharing personal volumetric captures to a friend and experiencing a friend's capture instead of own, or combining the two.

Figure 8:
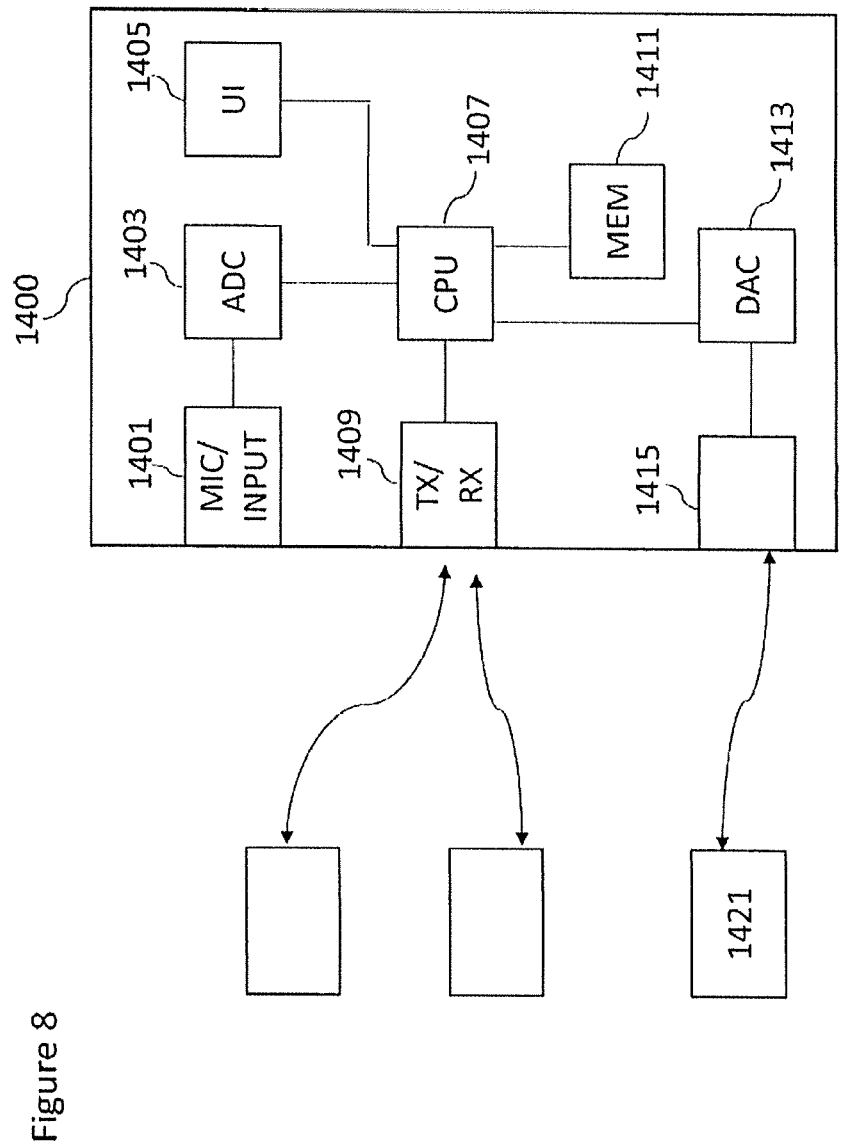
FIG. 8 shows schematically an example device suitable for implementing the apparatus shown in previous figures.

With respect to FIG. 8 an example electronic device which may be used as the capture device and/or audio signal analyser/processor and/or playback device is shown. The device may be any suitable electronics device or apparatus. For example in some embodiments the device 1400 is a mobile device, user equipment, tablet computer, computer, audio playback apparatus, etc.

The device 1400 may comprise a microphone or microphone array 1401. The microphone or microphone array 1401 may comprise a plurality (for example a number N) of microphone elements. However it is understood that there may be any suitable configuration of microphones and any suitable number of microphones. In some embodiments the microphone or microphone array 1401 is separate from the apparatus and the audio signal transmitted to the apparatus by a wired or wireless coupling. The microphone or microphone array 1401 may in some embodiments be the microphone array as shown in the previous figures.

The microphone or microphone array may comprise transducers configured to convert acoustic waves into suitable electrical audio signals. In some embodiments the microphone or microphone array may comprise solid state microphones. In other words the microphones may be capable of capturing audio signals and outputting a suitable digital format signal. In some other embodiments the microphone or microphone array 1401 can comprise any suitable microphone type or audio capture means, for example condenser microphone, capacitor microphone, electrostatic microphone, Electret condenser microphone, dynamic microphone, ribbon microphone, carbon microphone, piezoelectric microphone, or microelectrical-mechanical system (MEMS) microphone. The microphone or microphone array can in some embodiments output the audio captured signals to an analogue-to-digital converter (ADC) 1403.

The device 1400 may further comprise an analogue-to-digital converter 1403. The analogue-to-digital converter 1403 may be configured to receive the audio signals from each microphone 1401 and convert them into a format suitable for processing. In some embodiments where the microphone or microphone array comprises integrated microphone the analogue-to-digital converter is not required. The analogue-to-digital converter 1403 can be any suitable analogue-to-digital conversion or processing means. The analogue-to-digital converter 1403 may be configured to output the digital representations of the audio signals to a processor 1207 or to a memory 1411.

In some embodiments the device 1400 comprises at least one processor or central processing unit 1207. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating with the position determiner as described herein.

In some implements the device 1400 comprises a transceiver 1409. The transceiver 1409 in such embodiments can be coupled to the processor 1407 and configured to enable a communication with other apparatus or electronic devices, for example via a wireless communications network. The transceiver 1409 or any suitable transceiver or transmitter and/or receiver means can in some embodiments be configured to communicate with other electronic devices or apparatus via a wire or wired coupling.

For example the transceiver 1409 may be configured to communicate with the renderer as described herein.

The transceiver 1409 can communicate with further apparatus by any suitable known communications protocol. For example in some embodiments the transceiver 1409 or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

In some embodiments the device 1400 may be employed as at least part of the audio processor. As such the transceiver 1409 may be configured to receive the audio signals and positional information from the capture device microphones or microphone array and in some embodiments determine the parameters as described herein by using the processor 1407 executing suitable code. Furthermore the device may generate a suitable audio signal and parameter output to be transmitted to the renderer or spatial processing device.

In some embodiments the device 1400 may be employed as at least part of the renderer. As such the transceiver 1409 may be configured to receive the audio signals from the microphones or microphone array and in some embodiments the parameters determined at the capture device or processing device as described herein, and generate a suitable audio signal rendering by using the processor 1407 executing suitable code. The device 1400 may comprise a digital-to-analogue converter 1413. The digital-to-analogue converter 1413 may be coupled to the processor 1407 and/or memory 1411 and be configured to convert digital representations of audio signals (such as from the processor 1407 following an audio rendering of the audio signals as described herein) to a suitable analogue format suitable for presentation via an audio subsystem output. The digital-to-analogue converter (DAC) 1413 or signal processing means can in some embodiments be any suitable DAC technology.

Furthermore the device 1400 can comprise in some embodiments an audio subsystem output 1415. An example as shown in FIG. 8 shows the audio subsystem output 1415 as an output socket configured to enabling a coupling with headphones 1421. However the audio subsystem output 1415 may be any suitable audio output or a connection to an audio output. For example the audio subsystem output 1415 may be a connection to a multichannel speaker system.

In some embodiments the digital to analogue converter 1413 and audio subsystem 1415 may be implemented within a physically separate output device. For example the DAC 1413 and audio subsystem 1415 may be implemented as cordless earphones communicating with the device 1400 via the transceiver 1409.

Although the device 1400 is shown having both audio capture, audio processing and audio rendering components, it would be understood that in some embodiments the device 1400 can comprise just some of the elements.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus for spatial audio signal processing, the apparatus comprising:
   at least one processor; and
   at least one non-transitory memory and computer program code, wherein the at least one memory and the computer program code are configured to, with the at least one processor, cause the apparatus to:
   receive captured audio content, wherein the captured audio content is captured within a capture environment with defined geometry, wherein the captured audio content comprises at least audio associated with a first audio source;
   determine a first audio direction and distance, associated with the first audio source of the captured audio content, relative to the defined geometry of the capture environment;
   determine a listening space area geometry;
   map the first audio direction and distance to a distance and a direction relative to the listening space area geometry, wherein at least one of the distance and/or direction relative to the determined listening space geometry is different than the first distance and/or the first direction associated with the first audio source; and
   synthesize a volumetric audio based on at least the mapped audio direction and distance to generate an audio content experience within the listening space area geometry.

2. The apparatus as claimed in claim 1, wherein the at least one memory and the computer program code configured to, with the at least one processor, cause the apparatus to receive the captured audio content are further configured to cause the apparatus to receive at least one of:
   professional audio content, the professional audio content captured within the capture environment with the defined geometry; or
   personal audio content, the personal audio content captured within the capture environment with the defined geometry.

3. The apparatus as claimed in claim 1, wherein the at least one memory and the computer program code configured to, with the at least one processor, cause the apparatus to determine at least the first audio direction and distance associated with the captured audio content are further configured to cause the apparatus to one of:
   receive at least the first audio direction and distance associated with the captured audio content; or
   analyse the captured audio content to generate at least the first audio direction and distance associated with the captured audio content.

4. The apparatus as claimed in claim 1, wherein the at least one memory and the computer program code configured to, with the at least one processor, cause the apparatus to receive the captured audio content are further configured to cause the apparatus to receive:
   professional audio content, the professional audio content captured within the capture environment with the defined geometry; and
   personal audio content, the personal audio content captured within the capture environment with the defined geometry, wherein the at least one memory and the computer program code configured to, with the at least one processor, cause the apparatus to determine at least the first audio direction and distance associated with the captured audio content are further configured to cause the apparatus to:
   generate a local personal audio content by removing a common part between the captured professional audio content and the captured personal audio content from the captured personal audio content; and
   analyse the local personal audio content to determine audio directions and distances associated with the local personal audio content.

5. The apparatus as claimed in claim 4, wherein the at least one memory and the computer program code configured to, with the at least one processor, cause the apparatus to determine at least the first audio direction and distance associated with the captured audio content are further configured to cause the apparatus to:
   generate a far professional audio content by removing the common part between the captured professional audio content and the captured personal audio content from the captured professional audio content; and
   analyse the far professional audio content to determine audio directions and distances associated with the far professional audio content.

6. The apparatus as claimed in claim 5, wherein the at least one memory and the computer program code configured to, with the at least one processor, cause the apparatus to synthesize the volumetric audio based on at least the mapped audio direction and distance to generate the audio content experience within the listening space area geometry are further configured to cause the apparatus to:
   synthesize a personal volumetric audio using the local personal audio content based on at least the mapped audio direction and distance to generate a local personal audio content experience within the listening space area geometry;
   synthesize a professional volumetric audio using the far professional audio content based on at least the mapped audio direction and distance to generate a far professional audio content experience within the listening space area geometry associated with the professional audio content; and
   mix the professional volumetric audio and the personal volumetric audio to generate the volumetric audio to generate the audio content experience.

7. The apparatus as claimed in claim 6, wherein the at least one memory and the computer program code configured to, with the at least one processor, cause the apparatus to synthesize the professional volumetric audio are further configured to cause the apparatus to synthesize the professional volumetric audio based on a determined listening position.

8. The apparatus as claimed in claim 6, wherein the at least one memory and the computer program code configured to, with the at least one processor, cause the apparatus to synthesize the personal volumetric audio are further configured to cause the apparatus to:
   determine a listening position; and
   synthesize the personal volumetric audio based on the listening position.

9. The apparatus as claimed in claim 4, wherein the at least one memory and the computer program code configured to, with the at least one processor, cause the apparatus to receive captured personal audio content are further configured to cause the apparatus to receive at least two separate captured personal audio contents, and wherein the at least one memory and the computer program code are further configured to, with the at least one processor, cause the apparatus to selectively switch between the at least two separate captured personal audio contents based on a user interface input.

10. The apparatus as claimed in claim 1, wherein the at least one memory and the computer program code configured to, with the at least one processor, cause the apparatus to determine the listening space area geometry are further configured to cause the apparatus to:
determine within the listening space area geometry a listening space area geometry associated with the captured audio content.

11. The apparatus as claimed in claim 1, wherein the at least one memory and the computer program code configured to, with the at least one processor, cause the apparatus to determine the listening space area geometry are further configured to cause the apparatus to:
receive information from at least one sensor located within the listening space; and
determine the listening space area geometry from the information from the at least one sensor located within the listening space.

12. The apparatus as claimed in claim 11, further comprising the at least one sensor, wherein the at least one sensor comprises at least one of:
a camera pair;
a phase or time difference based laser range detector; or
a light field camera.

13. The apparatus as claimed in claim 2, wherein the captured professional audio content comprises at least one of:
an audio signal captured by a close microphone within the capture environment;
an audio signal captured by a public address microphone within the capture environment;
an audio signal captured from a mixing desk within the capture environment; or
an audio signal captured by a spatial microphone array within the capture environment.

14. A method for spatial audio signal processing comprising:
receiving captured audio content, the captured audio content captured within a capture environment with defined geometry, wherein the captured audio content comprises at least audio associated with a first audio source;
determining a first audio direction and distance, associated with the first audio source of the captured audio content, relative to the defined geometry of the capture environment;
determining a listening space area geometry;
mapping the first audio direction and distance to distance to a distance and a direction relative to the listening space area geometry, wherein at least one of the distance and/or direction relative to the determined listening space geometry is different than the first distance and/or the first direction associated with the first audio source; and
synthesizing a volumetric audio based on at least the mapped audio direction and distance to generate an audio content experience within the listening space area geometry.

15. The method as claimed in claim 14, wherein receiving the captured audio content further comprises at least one of:
receiving professional audio content, the professional audio content captured within the capture environment with the defined geometry; or
receiving personal audio content, the personal audio content captured within the capture environment with the defined geometry.

16. The method as claimed in claim 14, wherein determining at least the first audio direction and distance associated with the captured audio content comprises one of:
receiving at least the first audio direction and distance associated with the captured audio content; or
analysing the captured audio content to generate at least the first audio direction and distance associated with the captured audio content.

17. The method as claimed in claim 14, wherein receiving the captured audio content comprises:
receiving professional audio content, the professional audio content captured within the capture environment with the defined geometry; and
receiving personal audio content, the personal audio content captured within the capture environment with the defined geometry, wherein determining at least the first audio direction and distance associated with the captured audio content comprises:
generating a local personal audio content by removing a common part between the captured professional audio content and the captured personal audio content from the captured personal audio content; and
analysing the local personal audio content to determine audio directions and distances associated with the local personal audio content.

18. The method as claimed in claim 17, wherein determining at least the first audio direction and distance associated with the captured audio content comprises:
generating a far professional audio content by removing the common part between the captured professional audio content and the captured personal audio content from the captured professional audio content; and
analysing the far professional audio content to determine audio directions and distances associated with the far professional audio content.

19. The method as claimed in claim 18, wherein synthesizing the volumetric audio based on at least the mapped audio direction and distance to generate the audio content experience within the listening space area geometry comprises:
synthesizing a personal volumetric audio using the local personal audio content based on the mapped audio direction and distance to generate a local personal audio content experience within the listening space area geometry;
synthesizing a professional volumetric audio using the far professional audio content based on the mapped audio direction and distance to generate a far professional audio content experience within the listening space area geometry associated with the professional audio content; and
mixing the professional volumetric audio and the personal volumetric audio to generate the volumetric audio to generate the audio content experience.

20. The method as claimed in claim 19, further comprising at least one of:
determining a listening position; and
synthesizing the personal volumetric audio based on the listening position.

* * * * *